United States Patent
Kannan

(10) Patent No.: US 11,989,321 B2
(45) Date of Patent: May 21, 2024

(54) MULTI-MODAL APPROACH TO A SECURE AND CLOSED SOLUTION MONITORING AND CONTROL OF USER DATA

(71) Applicant: ARRIS Enterprises LLC, Suwanee, GA (US)

(72) Inventor: Navneeth N. Kannan, Doylestown, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 97 days.

(21) Appl. No.: 17/395,787

(22) Filed: Aug. 6, 2021

(65) Prior Publication Data

US 2022/0043933 A1    Feb. 10, 2022

Related U.S. Application Data

(60) Provisional application No. 63/090,964, filed on Oct. 13, 2020, provisional application No. 63/062,835, filed on Aug. 7, 2020.

(51) Int. Cl.
*H04L 29/06* (2006.01)
*G06F 21/62* (2013.01)
*H04L 9/40* (2022.01)

(52) U.S. Cl.
CPC ........ *G06F 21/6245* (2013.01); *H04L 63/102* (2013.01)

(58) Field of Classification Search
CPC ............................ G06F 21/6245; H04L 63/102
See application file for complete search history.

(56) References Cited

U.S. PATENT DOCUMENTS

| | | | |
|---|---|---|---|
| 8,380,796 B2* | 2/2013 | Robertson | H04L 65/403 709/204 |
| 10,242,232 B1* | 3/2019 | Hurry | H04L 63/107 |
| 11,409,898 B1* | 8/2022 | Jensen | G06F 21/6245 |
| 2003/0041326 A1 | 2/2003 | Novak et al. | |

(Continued)

OTHER PUBLICATIONS

International Search Report and the Written Opinion of the International Searching Authority dated Oct. 25, 2021 in International (PCT) Application No. PCT/US2021/044937.

(Continued)

*Primary Examiner* — Shin-Hon (Eric) Chen
(74) *Attorney, Agent, or Firm* — Wenderoth, Lind & Ponack, L.L.P.

(57) ABSTRACT

A multi-modal portal system provides a secure network environment for the management of user data. A variety of network devices interface with various sensing devices associated with a user to obtain sensory data or user data. The user data collected from the sensing devices can be communicated to the multi-modal portal system. The multi-modal portal system provides an access portal, analytics engine and data aggregator such that user data associated with the various sensing devices can be stored, accessed, modified, altered, etc. An audit trail is associated with the user data so that all transactions associated with the user data can be tracked. The user data can only be accessed, modified, altered, stored, etc. based on one or more profile configurations. Each user is associated with one or more profile configurations to ensure security and privacy of the user data.

20 Claims, 6 Drawing Sheets

250

| User Profile 502 | Profile Description 504 | Access Parameters 506 | | | | | |
|---|---|---|---|---|---|---|---|
| | | Video Call | Camera Data | Diagnostic Data | Sensor Data | Activity Data | Protected Data | New Data |
| Primary Contact | Family Friend Guardian | Yes | Yes | No | Yes | Yes | No | |
| Caregiver | Personal Staff/Nurse | Yes | Yes | Yes | Yes | Yes | No | |
| Healthcare Prof. | Doctor(s) | Yes | Yes | Yes | Yes | Yes | Yes | |
| Coordinator | Care Admin. | Yes | No | No | Yes | No | No | |
| Personal Services | General Staff | No | No | No | No | No | No | |
| New Profile 1 | | | | | | | | |
| New Profile 2 | | | | | | | | |

(56) References Cited

U.S. PATENT DOCUMENTS

| | | | | |
|---|---|---|---|---|
| 2011/0214153 | A1* | 9/2011 | Rosenfeld | H04N 7/15 |
| | | | | 725/78 |
| 2014/0337914 | A1* | 11/2014 | Canning | H04L 63/10 |
| | | | | 726/1 |
| 2014/0351924 | A1* | 11/2014 | Myers | H04L 63/102 |
| | | | | 726/15 |
| 2016/0122391 | A1* | 5/2016 | Lapidot | A61P 35/04 |
| | | | | 514/19.8 |
| 2018/0060593 | A1* | 3/2018 | Abraham | G06F 16/9535 |
| 2019/0130123 | A1* | 5/2019 | Ben-Yair | H04L 63/105 |
| 2019/0158658 | A1 | 5/2019 | Gebers et al. | |
| 2019/0253431 | A1* | 8/2019 | Atanda | G06Q 30/0201 |
| 2020/0286600 | A1* | 9/2020 | De Brouwer | G16H 50/20 |
| 2021/0004923 | A1* | 1/2021 | Mackenzie | G06F 16/27 |
| 2021/0182438 | A1* | 6/2021 | Huitt | G06F 21/84 |
| 2021/0211430 | A1* | 7/2021 | Dande | G06F 9/3891 |

OTHER PUBLICATIONS

International Preliminary Report on Patentability dated Feb. 7, 2023 in International (PCT) Application No. PCT/US2021/044937.

\* cited by examiner

| User Profile 502 | Profile Description 504 | Access Parameters 506 | | | | | | |
|---|---|---|---|---|---|---|---|---|
| | | Video Call | Camera Data | Diagnostic Data | Sensor Data | Activity Data | Protected Data | New Data |
| Primary Contact | Family Friend Guardian | Yes | Yes | No | Yes | Yes | No | |
| Caregiver | Personal Staff/Nurse | Yes | Yes | Yes | Yes | Yes | No | |
| Healthcare Prof. | Doctor(s) | Yes | Yes | Yes | Yes | Yes | Yes | |
| Coordinator | Care Admin. | Yes | No | No | Yes | No | No | |
| Personal Services | General Staff | No | No | No | No | No | No | |
| New Profile 1 | | | | | | | | |
| New Profile 2 | | | | | | | | |

FIG. 5

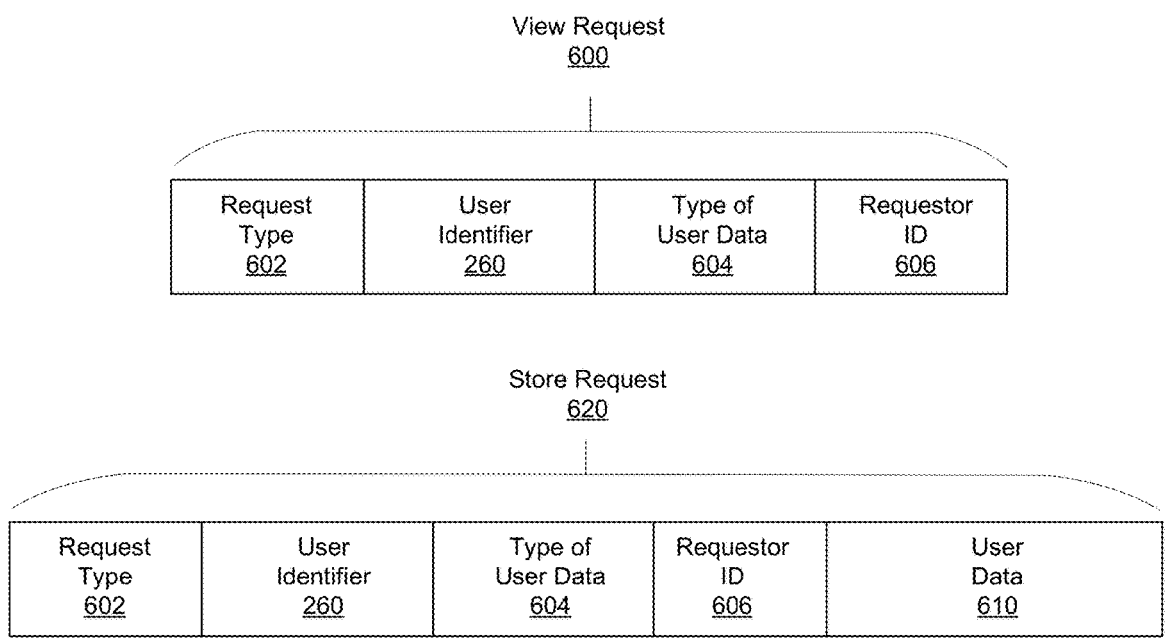

FIG. 6

MULTI-MODAL APPROACH TO A SECURE AND CLOSED SOLUTION MONITORING AND CONTROL OF USER DATA

BACKGROUND

Companies are increasingly providing a wireless fidelity (Wi-Fi) management, with multiple access point devices and/or extender access point devices (collectively, network devices) within the home or network environment to improve Quality of Experience (QoE) of the user by offering additional services. For example, as healthcare costs continue to increase, there is an increasing desire with aging adults to stay in place (in home) for extended care services. While there are many individual technologies to address niche problems, such as aging-in-place, given the rapid rise of connectivity technologies and software protocols, especially in the area of sensing devices or meters, and the use of Artificial Intelligence techniques for predictive and analytical methods, these technologies can be confusing and difficult to configure making ubiquitous adoption of a particular technology unlikely. Thus, there is a need for a more robust, cloud-based approach that accommodates multiple-modes of sensory data to monitor and control access to the sensory data while addressing security and privacy concerns associated with the sensory data.

SUMMARY

Generally, there are many devices in the market that operate or behave as point solutions for specific monitoring of aspects associated with a user, for example, to obtain sensory data. Each solution may have an associated device and an associated application that runs on the associated device. However, these solutions or technologies can require different protocols and solution-specific applications, software, and/or devices. Further, these solutions may not be operable with other solutions or technologies already in use by a user. Accumulating and/or analyzing the sensory data or information from these various solutions or technologies can be daunting and thus not implementable by a user especially when the data is particular sensitive giving rise to security and privacy concerns. According to aspects of the present disclosure there are provided novel solutions for managing and controlling access to data associated with a user, for example, one or more biometrics or any other sensory data. These novel solutions allow for accommodation of multiple solutions and technologies such that the data associated with the user can be managed and controlled for use or access by designated or particular individuals to ensure security and privacy of the data. For example, aggregating various data from multiple sensing devices can provide a medical or care staff the information needed to address the well-being of a particular user based on one or more profile configurations that ensure that only authorized or verified users and/or network devices can access the data. In this way, data specific to a user (for example, any type of sensory data or other information, collectively referred to as user data) is kept secure and privacy is ensured.

An aspect of the present disclosure provides a multi-modal portal system of a network for controlling access to user data. The multi-modal portal system comprises a memory storing one or more computer-readable instructions, and a processor configured to execute the one or more computer-readable instructions to receive, via an access portal, a first request associated with a first user data from a first network device, wherein the first user data is associated with a first client user, wherein the first request comprises a first user profile, and wherein the first user data comprises one or more first types of user data, determine, by an analytics engine, one or more first access parameters associated with the first user profile, and control access to the first user data based on the one or more first access parameters associated with the first user profile.

In an aspect of the present disclosure, the multimodal portal system such that the first request comprises an access request for the first user data from a data aggregator.

In an aspect of the present disclosure, the processor is further configured to execute the one or more instructions to compare the one or more first access parameters to the one or more first types of user data, format a first response based on the comparison and the first user data, and send the first response to the first network device.

In an aspect of the present disclosure, the processor is further configured to execute the one or more instructions to determine that the first user profile is associated with a type of user and wherein the one or more first access parameters are based on the type of user.

In an aspect of the present disclosure, the processor is further configured to execute the one or more instructions to receive, via the access portal, a second request associated with a second user data from a second network device, wherein the second user data is associated with a second client user, wherein the second request comprises a second user profile, and wherein the second user data comprises one or more second types of data, determine, by the analytics engine, one or more second access parameters associated with the second user profile, and control access to the second user data based on the one or more second access parameters associated with the second user profile.

In an aspect of the present disclosure, the multimodal portal system such that the controlling access to the first user data and the second user data comprises receiving, via the access portal, a third request associated with the first user data and the second user data from a third network device, wherein the third request comprises a third user profile, determining that the third user profile is associated with one or more third access parameters, and wherein the controlling access to the second user data and the first user data comprises sending the first user data and the second user data to the third network device based on the one or more third access parameters.

In an aspect of the present disclosure, the processor is further configured to execute the one or more instructions to receive, from a multi-modal mesh hub, a store request to store a third user data in the data aggregator, wherein the third user data is associated with the first client user, wherein the store request comprises a requestor identifier, verify the requestor identifier based on the client user, and store the third user data based on the verification.

An aspect of the present disclosure provides a method for providing a multi-modal portal system of a network for controlling access to user data, the method comprising receiving, via an access portal, a first request associated with a first user data from a first network device, wherein the first user data is associated with a first client user, wherein the first request comprises a first user profile, and wherein the first user data comprises one or more first types of user data, determining, by an analytics engine, one or more first access parameters associated with the first user profile, and controlling access to the first user data based on the one or more first access parameters associated with the first user profile.

In an aspect of the present disclosure, the method is such that the first request comprises an access request for the first user data from a data aggregator.

In an aspect of the present disclosure, the method further comprising comparing the one or more first access parameters to the one or more first types of user data, formatting a first response based on the comparison and the first user data, and sending the first response to the first network device.

In an aspect of the present disclosure, the method further comprising determining that the first user profile is associated with a type of user, wherein the one or more first access parameters are based on the type of user.

In an aspect of the present disclosure, the method further comprising receiving, via the access portal, a second request associated with a second user data from a second network device, wherein the second user data is associated with a second client user, wherein the second request comprises a second user profile, and wherein the second user data comprises one or more second types of data, determining, by the analytics engine, one or more second access parameters associated with the second user profile, and controlling access to the second user data based on the one or more second access parameters associated with the second user profile.

In an aspect of the present disclosure, the method further comprising receiving, via the access portal, a third request associated with the first user data and the second user data from a third network device, wherein the third request comprises a third user profile, determining that the third user profile is associated with one or more third access parameters, and wherein the controlling access to the second user data and the first user data comprises sending the first user data and the second user data to the third network device based on the one or more third access parameters.

In an aspect of the present disclosure, the method further comprises receiving, from a multi-modal mesh hub, a store request to store a third user data in the data aggregator, wherein the third user data is associated with the first client user, wherein the store request comprises a requestor identifier, verifying the requestor identifier based on the client user, and storing the third user data based on the verification.

An aspect of the present disclosure provides a non-transitory computer-readable medium of a multi-modal portal system storing one or more instructions for controlling access to user data. The one or more instructions when executed by a processor of the multi-modal portal system of a network, cause the multi-modal portal system to perform one or more operations including the steps of the methods described above.

Thus, according to various aspects of the present disclosure described herein, it is possible to manage and control the access to user data, for example, user data received from one or more sensing devices. The novel solution(s) provide a multi-modal portal system that aggregates information, user data from one or more sensing devices, for use by one or more individuals or users according to an associated profile configuration that includes a user profile associated with one or more access parameters that define the limits to the access, for example, the type of data accessible by a type of user. In this way, individuals and/or network devices can obtain necessary information associated with a particular user, for example, a patient or client. Controlling access to the user's data based on a user profile allows for the management of the user's data from various resources or network devices while preventing unauthorized access to the user's data. For example, certain caregivers, those associated with home care services, may only require a certain level of user data while other caregivers, such as doctors, may require that all user data be accessible. The user data can be aggregated and made accessible to all the individuals or users associated with a particular user to provide an enhanced QoE for a user while safeguarding privacy and ensuring security.

BRIEF DESCRIPTION OF DRAWINGS

In the drawings, like reference numbers generally indicate identical, functionally similar, and/or structurally similar elements.

FIG. 5 is an exemplary profile configuration for a multi-modal portal system, according to one or more aspects of the present disclosure;

FIG. 6 illustrates an exemplary request associated with a multi-modal portal system, according to one or more aspects of the present disclosure.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
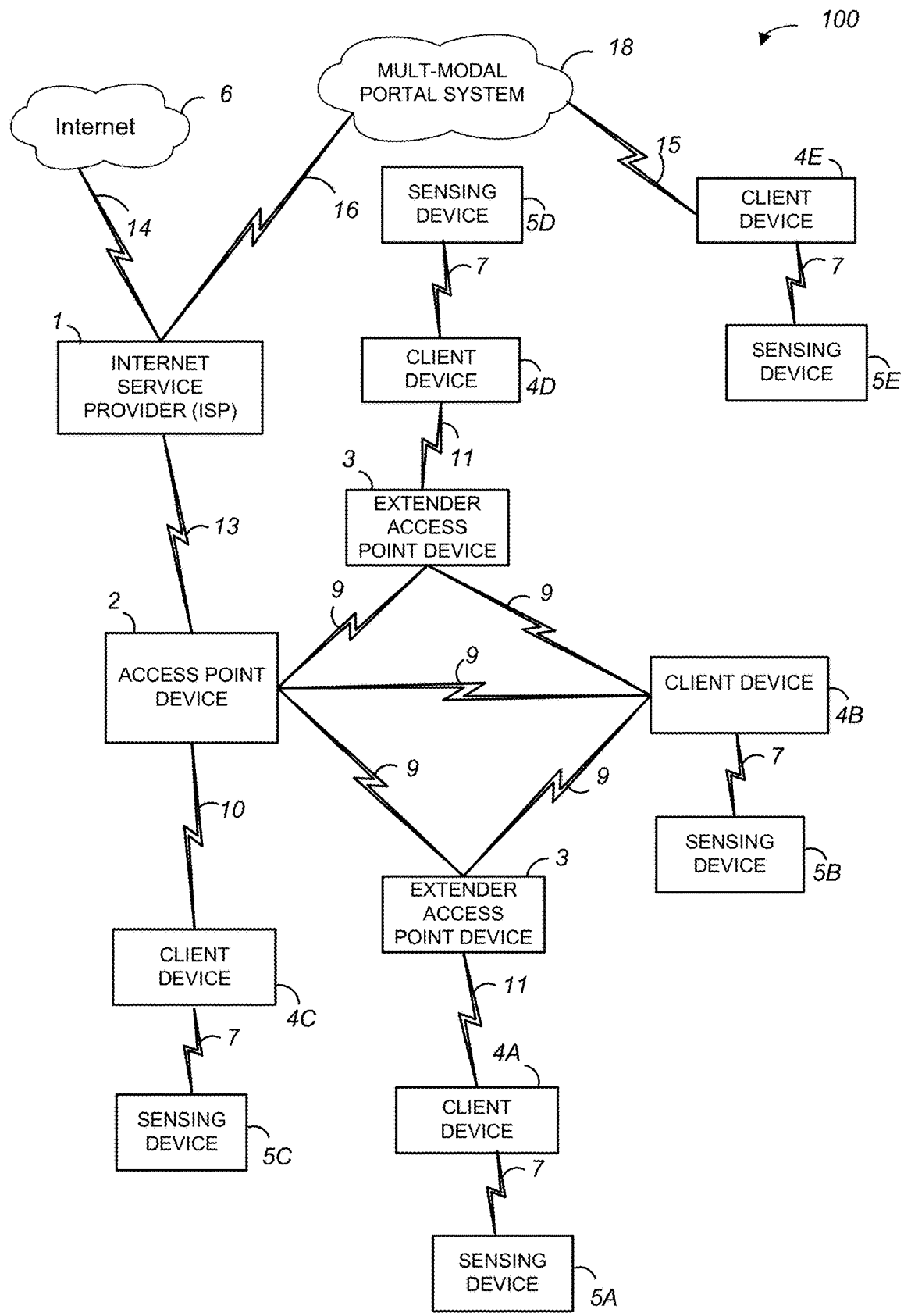
FIG. 1 is a schematic diagram of a network environment, according to one or more aspects of the present disclosure.

FIG. 1 is a schematic diagram of a network environment 100, according to one or more aspects of the present disclosure. For example, a secure, multi-modal, multi-protocol monitoring and communication network environment can provide for aggregation of user data from multiple network devices and/or sources. An example network environment can be related to a caregiving network for a user (a patient) such that one or more aspects associated with the user (for example, biometric data) can be aggregated and/or monitored from multiple network devices capable of sensing the one or more aspects. Access to the aggregated and/or monitored data can be controlled based on one or more profile configurations as discussed with reference to FIG. 5.

It should be appreciated that various example embodiments of inventive concepts disclosed herein are not limited to specific numbers or combinations of devices, and there may be one or multiple of some of the aforementioned electronic apparatuses in the network environment, which may itself consist of multiple communication networks and various known or future developed wireless connectivity technologies, protocols, devices, and the like.

As shown in FIG. 1, the main elements of the network environment 100 include a network comprising an access point device 2 connected to a network resource such as any of the Internet 6, a multi-modal portal system 18, any other cloud storage/repository, or any combination thereof via an Internet Service Provider (ISP) 1 and also connected to different wireless devices or network devices such as one or more wireless extender access point devices 3, one or more client devices 4A-4E (collectively referred to as client device(s) 4), and one or more sensing devices 5A-5E (collectively referred to as sensing device(s) 5). The network environment 100 shown in FIG. 1 includes wireless network devices (e.g., extender access point devices 3 and client devices 4) that may be connected in one or more wireless networks (e.g., private, guest, iControl, backhaul network, or Internet of things (IoT) network) within the network environment 100. Additionally, there could be some overlap between wireless devices (e.g., extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

Starting from the top of FIG. 1, the ISP 1 can be, for example, a content provider or any computer for connecting the access point device 2 to a network resource, such as Internet 6 and multi-modal portal system 18. For example, Internet 6 can be a cloud-based service that provides access to a cloud-based repository accessible via ISP 1 where the cloud-based repository comprises information associated with or an access requested by any one or more network devices of the network environment 100. The multi-modal portal system 18 can provide monitoring, aggregation and/or controlling of data associated with a user in the network environment 100, such as data collected by one or more sensing devices 5. In one or more embodiments, the multi-modal portal system 18 can communicate with any one or more repositories of Internet 6 via ISP 1. In one or more embodiments, any of the sensing devices 5 can be directly or indirectly coupled to the multi-modal portal system 18. The connection 14 between the Internet 6 and the ISP 1, the connection 16 between the multi-modal portal system 18 and the ISP 1, the connection 15 between the multi-modal portal system 18 and the client device 5E, and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

Any of the connections 13, 14, 15, 16, or any combination thereof (collectively referred to as network connections or connections) can further include as some portion thereof a broadband mobile phone network connection, an optical network connection, or other similar connections. For example, any of the network connections can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that any of the network connections are capable of providing connections between a network device and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the ISP 1 to one or more network devices (e.g., wireless extender access point devices 3 and client devices 4) in the network environment 100, or any combination thereof. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2 and the wireless extender access point devices 3, and client device 4B can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, long range (LoRa) wireless technology, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4.

The connection 11 between the extender access point devices 3 and the client devices 4A and 4D are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE protocol, LoRa wireless technology, ZigBee protocol, Z-Wave protocol, or IEEE 802.15.4 protocol. Also, one or more of the connections 11 can be a wired Ethernet connection. Any one or more connections 11 can carry information on any one or more channels that are available for use.

The client devices 4 can be, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2. Further, a client device 4 can be a network device that requires configuration by the access point device 2. In one or more embodiments, the client devices 4 can comprise any network device associated with a user for interacting with any type of one or more sensing devices 5. For example, the client device 4 can interact with a plurality of sensing devices 5 where each sensing device 5 senses one or more aspects associated with a user. In one or more embodiments, one or more sensing devices 5 are included within or local to (for example, built-in) the client device 4.

One or more sensing devices 5 can connect to one or more client devices 4, for example, via a connection 7. Connection 7 can utilize any one or more protocols or technologies discussed above with respect to connection 9. Any of the one or more sensing devices 5 can comprise a biometric sensor, a biometric tracker or sensor, temperature sensor, a light sensor, a humidity sensor, a motion detector or sensor (such as, an infrared motion sensor or Wi-Fi motion sensor), a facial recognition system, a camera or other image capturing device, a humidity sensor, a luminescence sensor, a medical diagnostic sensor (such as, a pulse oximeter or any other oxygen saturation sensing system, a blood pressure monitor, a temperature sensor, a glucose monitor, etc.), a voice recognition system, a microphone (such as, a far field voice (FFV) microphone) or other voice capture system, any other sensing device, or a combination thereof.

The connection 10 between the access point device 2 and the client device 4 is implemented through a wireless connection that operates in accordance with, but is not limited to, any IEEE 802.11 protocols. Additionally, the connection 10 between the access point device 2 and the client device 4C can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection. In one or more embodiments, any one or more client devices 4 utilize a protocol different than that of the access point device 2.

It is contemplated by the present disclosure that the multi-modal portal system 18, the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the multi-modal portal system 18, access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The multi-modal portal system 18, the access point device 2, the extender access point devices 3, and the client devices 4 are further equipped with components to facilitate communication with other computing/electronic devices or network devices over the one or more network connections to local and wide area networks, wireless and wired networks, public and private networks, and any other communication network enabling communication in the network environment 100.

Figure 2:
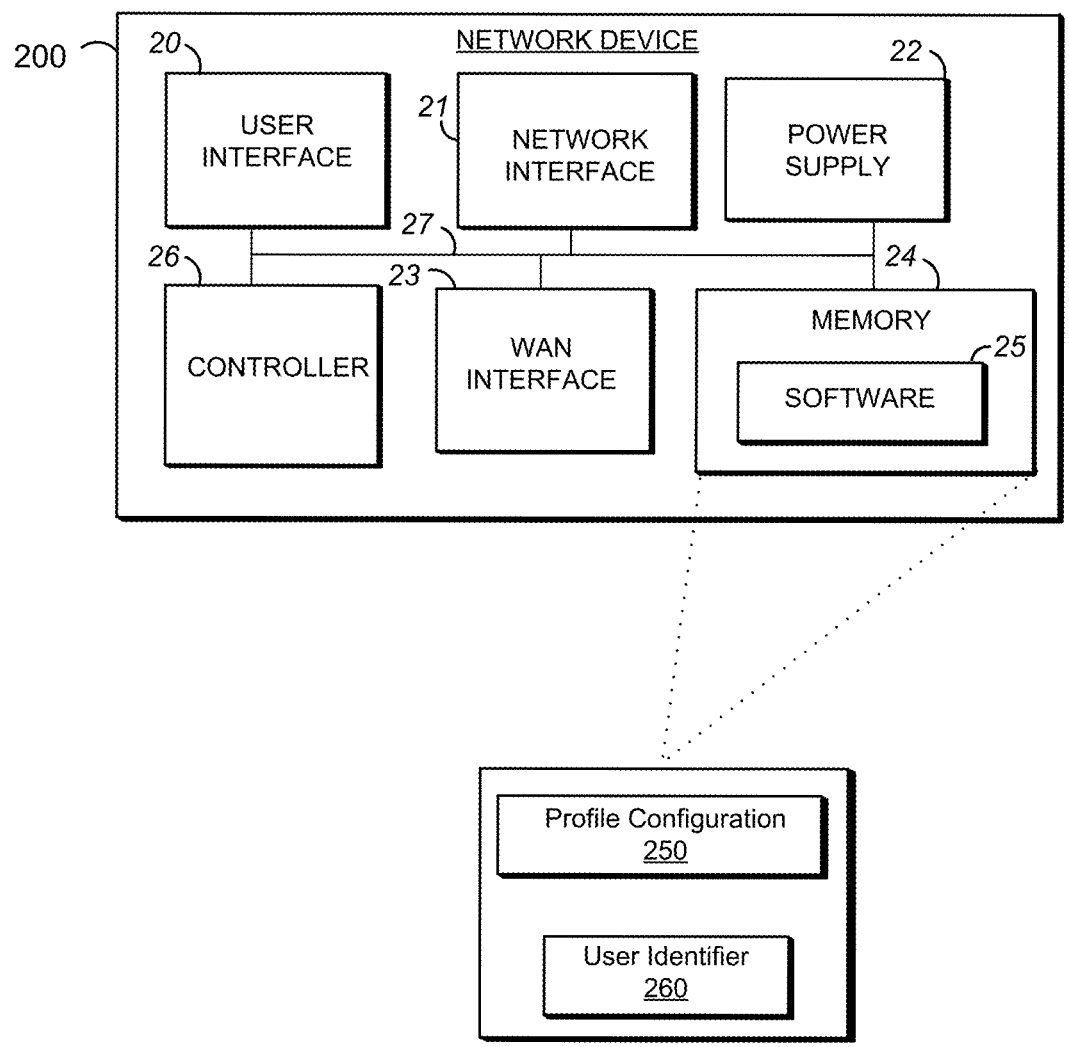
FIG. 2 is a more detailed block diagram illustrating various components of a network device, according to one or more aspects of the present disclosure.

FIG. 2 is a more detailed block diagram illustrating various components of an exemplary network device 200, such as a network device comprising any of a multi-modal portal system 18, an access point device 2, an extender access point device 3, a client device 4, any other electronic or network device, or any combination thereof implemented in the network environment 100 of FIG. 1, according to one or more aspects of the present disclosure.

Now referring to FIG. 2 the network device 200 can be, for example, a computer, a server, any other computer device with smart capabilities capable of connecting to the Internet 6, cellular networks, and interconnecting with other network devices via Wi-Fi and Bluetooth, or other wireless hand-held consumer electronic device capable of providing management and control of user data, for example, a multi-modal portal system 18, according to one or more aspects of the present disclosure. The network device 200 includes one or more internal components, such as a user interface 20, a network interface 21, a power supply 22, a controller 26, a WAN interface 23, a memory 34, and a bus 27 interconnecting the one or more elements.

The power supply 22 supplies power to the one or more internal components of the network device 200 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 20 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the network device 200, for example, for a user to enter any one or more profile configurations 250, a user identifier 260, any other information associated with a user or network device, or a combination thereof that are stored in memory 34. The network interface 20 can include, but is not limited to, various network cards, interfaces, and circuitry implemented in software and/or hardware to enable communications with and/or between the multi-modal portal system 18, the access point device 2, an extender access point device 3, and/or a client device 4 using any one or more of the communication protocols in accordance with any one or more connections (e.g., as described with reference to FIG. 1). In one or more embodiments, the user interface 20 enables communications with a sensing device 5, directly or indirectly.

The memory 24 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical storage system, a hard disk or any other various layers of memory hierarchy. The memory 24 can be used to store any type of instructions, software, or algorithms including software 25, for example, a multi-modal portal application for controlling the general function and operations of the network device 200 in accordance with one or more embodiments. In one or more embodiments, memory 24 can store any one or more profile configurations 250 associated with one or more user identifiers 260 so as to provide (for example, by a multi-modal portal application of a multi-modal portal system 18) aggregation, monitoring, and control of user data, such as user data received from one or more sensing devices 5. The one or more user identifiers 260 can comprise a unique identifier associated with one or more users, one or more network devices, or both. The one or more user identifiers 260 can be associated with one or more profile configurations 250 which include information associated with one or more profiles of one or more users. The multi-modal portal application can manage and control access to user data associated with the one or more user identifiers 260 based on the one or more configuration parameters 250. In one or more embodiments, the profile configuration 250 and/or the user identifier 260 is stored in any type of storage medium local to or remote from the network device 200.

The controller 26 controls the general operations of the network device 200 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 25 which can include a multi-modal portal application in accordance with one or more embodiments. Communication between the components (e.g., 20-26) of the network device 200 may be established using an internal bus 27.

The network interface 21 can include various network cards, interfaces, and circuitry implemented in software and/or hardware to enable communications with any one or more other network devices, for example, any of a client device 4, ISP 1, any other network device (e.g., as described with reference to FIG. 1), or a combination thereof. For example, the network interface 21 can include multiple radios or sets of radios (e.g., a 2.4 GHz radio, one or more 5 GHz radios, and/or a 6 GHz radio), which may also be referred to as wireless local area network (WLAN) interfaces. In one or more embodiments, one radio or set of radios (e.g., 5 GHz and/or 6 GHz radio(s)) provides a backhaul connection between the wireless extender access point device 3 and the access point device 2, and optionally other wireless extender access point device(s) 3. In one or more embodiments, the multi-modal portal system 18 is connected to or is part of the access point device 2 such that a backhaul connection is established between the multi-modal portal system 18 and one or more wireless extender access point devices 3. Another radio or set of radios (e.g., 2.4 GHz, 5 GHz, and/or 6 GHz radio(s)) provides a fronthaul connection between the extender access point device 3 and one or more client device(s) 4.

The wide area network (WAN) interface 23 may include various network cards, and circuitry implemented in software and/or hardware to enable communications between the access point device 2 and the ISP 1 using the wired and/or wireless protocols in accordance with connection 13 (e.g., as described with reference to FIG. 1).

Figure 3:
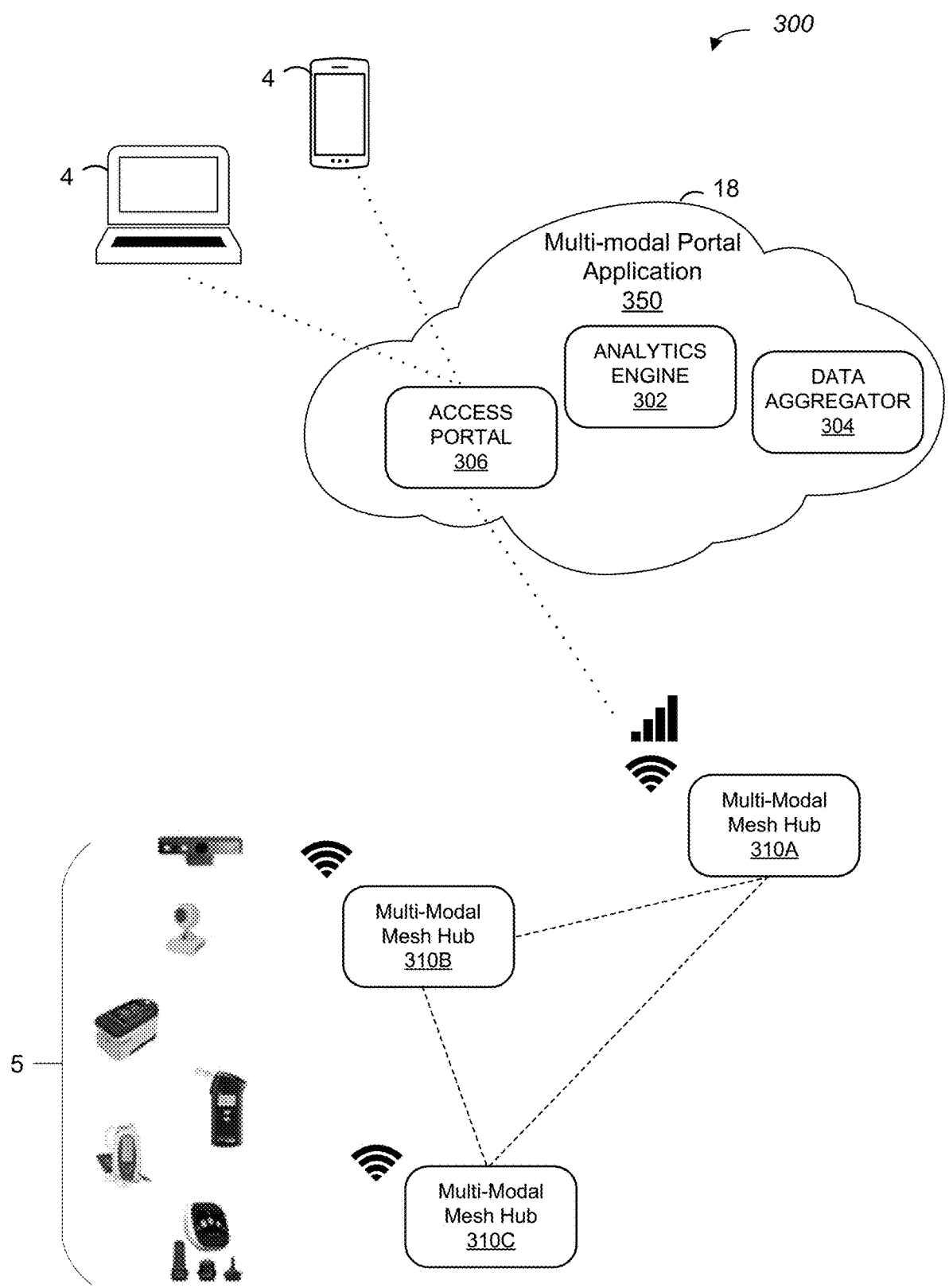
FIG. 3 is an illustration of a multi-modal portal system in a network environment, according to one or more aspects of the present disclosure.

FIG. 3 illustrates a multi-modal portal system 18 in a network environment 300, according to one or more aspects of the present disclosure. The network environment 300 provides an end-to-end closed network for management, control, and access of user data by one or more authorized users. The network environment 300 includes a multi-modal portal system 18, one or more client devices 4, one or more multi-modal mesh hubs 310A, 310B, and 310C (collectively referred to as multi-modal mesh hub(s) 310), and one or more sensing devices 5. In one or more embodiments, any of the multi-modal mesh hubs 310 can comprise an IoT hub that provides an interface to one or more sensing devices 5. In one or more embodiments, any one or more of the multi-modal mesh hubs 310 can store user data from any of the one or more sensing devices 5, for example, when a connection to the multi-modal portal system 18 is not available.

The multi-modal portal system 18 can be a network device 200 as discussed with reference to FIG. 2. The multi-modal portal system 18 provides a well-defined secure storage, aging, purging and external data transmission with egress points for user data based on explicit authorization with complete audit trail or transaction logging. The multi-modal portal system 18 can comprise a multi-modal portal application 350.

The multi-modal portal application 350 can provide management, control, and access of user data associated with one or more users. The multi-modal portal application 350 provides a secure remote interface to information associated with a user based on one or more profile configurations. For example, the multi-modal portal application 350 can comprise an access portal 306, an analytics engine 302, and a data aggregator 304. The access portal 306 can provide an interface to one or more client devices 4 connected directly or indirectly to the multi-modal portal system 18 and one or more multi-modal mesh hubs 310. The access portal 306 can comprise any of an application programming interface (API), a webpage, a graphical user interface, any other interface, or a combination thereof. The access portal 306 can receive one or more requests from one or more requestors, such as from one or more network devices (for example, one or more client devices 4, one or more sensing devices 5, or a combination thereof).

The data aggregator 304 can comprise any type of non-transitory computer-readable storage medium as discussed with reference to FIG. 2. The data aggregator 304 can store user data and/or one or more profile configurations 250, the one or more user identifiers 260, or both. The user data and/or the one or more profile configurations 250 can be associated with a user, a network device, a network environment, such as a home network environment, any other individual and/or system, or any combination thereof. The user data, the one or more profile configurations 250, the one or more user identifiers 260, or any combination thereof can be stored in any type of storage system including, but not limited to, a flat file system, a database, a table, a data structure, a data object, any other type of storage system, or any combination thereof.

The analytics engine 302 can receive a request from the access portal 306. The request can be from one or more requestors, such as one or more network devices and/or one or more users associated with one or more network devices. The request can include a command to access user data, to store user data, or both, a user identification associated with a user, and any other information. The analytics engine 302 can query the data aggregator 304 for the one or more profile configurations 250 associated with the one or more user identifiers 260. The analytics 302 can determine based on the one or more profile configurations 250 how to analyze the request. For example, the analytics engine 302 can compare the user identifier 260 to one or more profile configurations 250 and based on the comparison allow or deny the request. In one or more embodiments, the analytics engine 302 sends a prompt via the access portal 306 to the requestor (for example, a particular user and/or network device). The prompt can include a visual indication that the request has been processed, for example, allowed or denied.

The multi-modal mesh hubs 310 can comprise any one or more network devices that can form a mesh of data connectivity hubs. In one or more embodiments, multi-modal mesh hub 310A comprises an access point device 2, multi-modal mesh hub 310B comprises an extender access point device 3, and multi-modal mesh hub 310C comprises a client device 4. The multi-modal mesh hub 310A can interface or communicate with the access portal 306 so as to securely send a request to and/or receive a response from the multi-modal portal application 350. For example, the multi-modal mesh hub 310A may have an associated certificate that is transmitted along with any request to the multi-modal portal system 18 so that the multi-modal mesh hub 310A is properly authorized. The multi-modal mesh hubs 310 can work together as a virtual connectivity hub to communicate with the one or more client devices 4 and/or sensing devices 5 of a network environment 300. For example, the sensing devices 5 can comprise a camera, motion detector, any one or more diagnostic devices, one or more sensors, etc. The one or more sensing device 5 can be securely paired with any one or more multi-modal mesh hubs 310 to establish a secure association.

In one or more embodiments, the multi-modal mesh hub 310A connects directly to the multi-modal portal system 18 via an external data connection, such as an Internet Wi-Fi connection. In one or more embodiments, the multi-modal mesh hub 310A, or any other multi-modal mesh hub 310, can connect to the multi-modal portal system 18 via LTE or cellular connection that does not rely on an Internet Wi-Fi connection. In one or more embodiments, the LTE or cellular connection is a backup connection for the Internet Wi-Fi connection.

Figure 4:
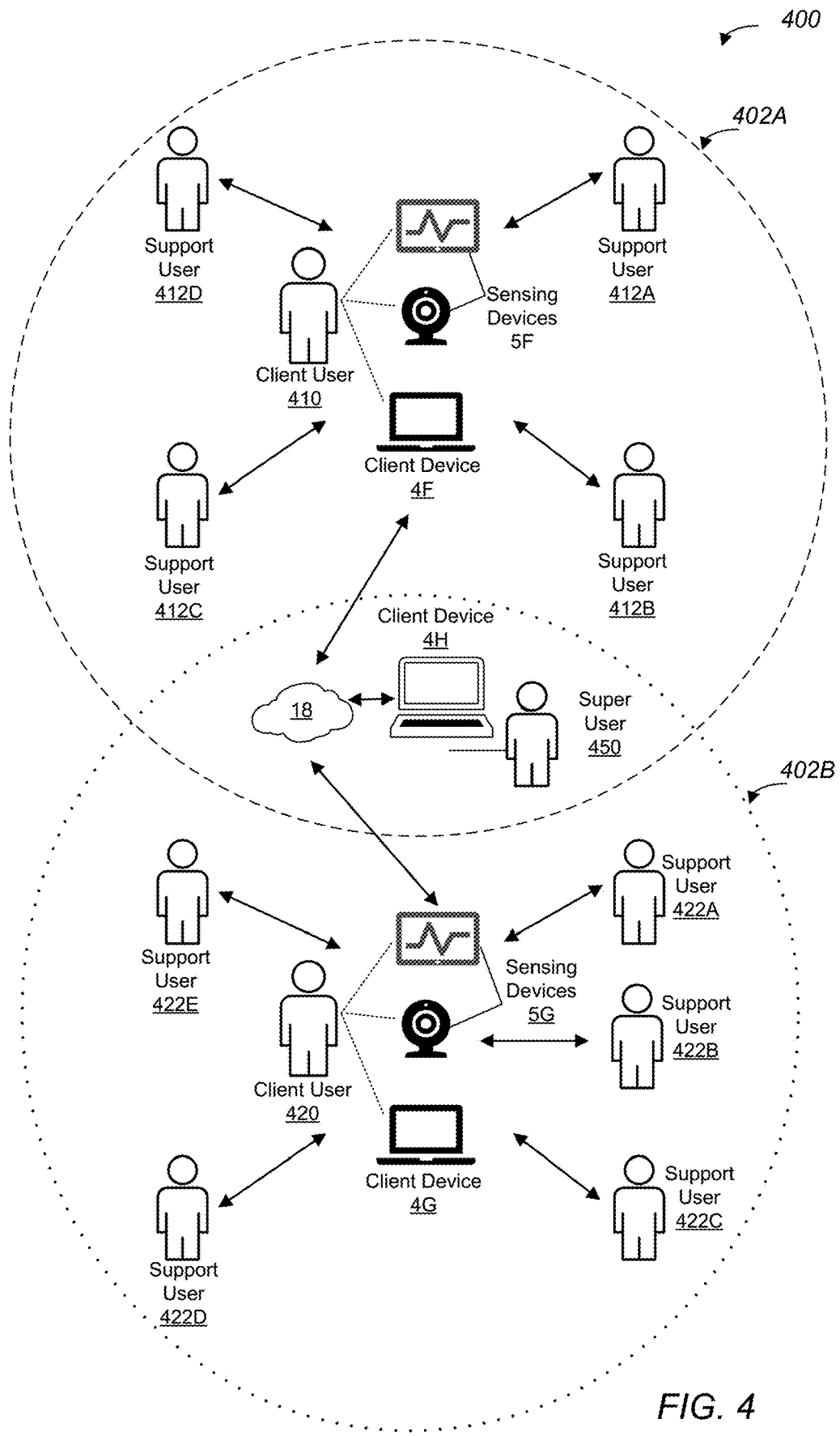
FIG. 4 is an illustration of a network environment for multiple multi-modal portal system networks, according to one or more aspects of the present disclosure.

FIG. 4 is an illustration of network environment 400 for multiple multi-modal portal system networks 402A and 402B, according to one or more aspects of the present disclosure. The network environment 400 can include one or more network devices for example, client devices 4F, 4G and 4H and/or sensing devices 5F and 5G, that are the same as or similar to the network environment 100 of FIG. 1, network device 200 of FIG. 2, and/or network environment 300 of FIG. 3. The network environment 400 can provide a closed secure support network where access is restricted based on one or more profile configurations 250 as discussed with reference to FIGS. 2 and 5. While the present disclosure discusses FIG. 4 in relation to one or more healthcare services, the present disclosure contemplates that any type of service can be associated with the network environment 400.

The network environment 400 can include one or more multi-modal portal system networks, such as multi-modal portal system networks 402A and 402B, collectively referred to as multi-modal portal system network(s) 402. Each multi-modal portal system network 402 can be associated with a client user, such as client user 410 and client user 420, a super user 450, and one or more support users 412A-412D (collectively referred to as support users 412), support users 422A-422E (collectively referred to as support users 422), one or more client devices 4F, 4G, and 4H (collectively referred to as client devices 4) one or more sensing devices 5A and 5B (collectively referred to as sensing devices 5), or any combination thereof. As an example, the network environment 400 can be associated with a healthcare services network environment for providing one or more healthcare services to one or more client users, such as client user 410 and client user 420.

A client user 410 of a multi-modal portal system network 402A can be associated with one or more sensing devices 5F (for example, one or more sensing devices 5 of FIG. 1) and one or more client devices 4F (for example, one or more client devices 4 of FIG. 1). One or more support users 412A, 412B, 412C, and 412D can be associated with the client user 410 for providing one or more healthcare services to user 410. The one or more support users 412 can access, such as any of view, modify, alter, store, and/or manage, user data associated with client user 410 via the client device 4F based on a corresponding profile configuration 250. Client device 4F can be connected to a multi-modal portal system 18 such that client device 4F can send and receive user data associated with client user 410 to and from the multi-modal portal system 18.

A client user 420 of a multi-modal portal system network 402B can be associated with one or more sensing devices 5G (for example, one or more sensing devices 5 of FIG. 1) and one or more client devices 4G (for example, one or more client devices 4 of FIG. 1). One or more support users 422A, 422B, 422C, 422D, and 422E can be associated with the client user 420 for providing one or more healthcare services to user 420. The one or more support users 422 can access, such as view, modify, alter, store and/or manage user data associated with client user 420 via the client device 4G based on a corresponding profile configuration 250. Client device 4G can be connected to a multi-modal portal system 18 such that client device 4G can send and receive user data associated with client user 420 to and from the multi-modal portal system 18.

Each of the client users 410 and 420 can be associated with a super user 450. Super user 450 can access user data associated with the client users 410 and 420 based on a corresponding profile configuration 250. The super user 450 can access the user data via a connection to the multi-modal portal system 18, for example, as discussed in reference to FIGS. 1-3. All of the user data associated with the client users 410 and 420 can be exchanged within the closed multi-modal portal system networks 402A and 402B, respectively, to enhance security.

In one or more embodiments, the network environment 400 is a healthcare services network. For example, multi-modal portal system network 402A can be a first healthcare network associated with a first patient (client user 410) and the multi-modal portal system network 402B can be a second healthcare network associated with a second patient (client user 420). The network environment 400, for example, can provide an aging-in-place environment for client users 410 and 420. The multi-modal portal system 18 can manage information associated with a user, for example, the client user 410 and the client user 420 based on one or more profile configurations 250. The one or more profile configurations 250 can comprise any of one or more user identifications 260 associated with one or more client users and/or one or more network devices, one or more parameters, any other parameters, or any combination thereof. The one or more user identifications 260 can comprise a unique identifier associated with a user, for example, client users 410 and 420 and/or a network device, for example, client devices 4.

The one or more profile configurations 250 can comprise one or more parameters. For example, FIG. 5 illustrates one or more profile configurations 250 for a multi-modal portal system 18, according to one or more aspects of the present disclosure. The one or more profile configurations 250 are associated with a healthcare services network, such as multi-modal portal system networks 402A and 402B. The one or more parameters of a profile configuration 250 can comprise one or more user profiles 502, one or more profile descriptions 504, one or more access parameters 506, any other parameters associated with a user and/or network device, or a combination thereof.

The one or more user profiles 502 are associated with one or more users and/or network devices and can include, but are not limited to, any of a primary contact, a caregiver, a healthcare professional, a coordinator, a personal service, any other type of user and/or network device, or any combination thereof. The one or more user profiles 502 can be associated with one or more profile descriptions 504 including, but not limited to, any of a family member, friend, and/or guardian, a personal staff member or nurse, a doctor, a care administrator, a general staff member, any other description, or a combination thereof. The one or more user profiles 502 can be associated with one or more access parameters 506.

The one or more access parameters 506 can include the types of data that a user or a network device associated with a corresponding user profile 502 is allowed to access, such as view, modify, store, manage etc. In one or more embodiments, the access parameters 506 can include any alphanumeric characters, a binary value, or any other value. For example, as illustrated, a "Yes" indicates access to the data while a "No" indicates that the data is not accessible by the corresponding user profile 502. In one or more embodiments, a binary "1" or "0" could be used or any other value. The one or more access parameters 506 can include, but are not limited to, any of a video call, an image data (such as from a camera), a diagnostic data (such as heart rate, blood pressure, oxygen level, weight, activity level, temperature, etc.), a sensor data, an activity data, a protected data, any other type of data, or a combination thereof.

The creating or setting up of a profile configuration 250 can begin with assignment of roles to individuals and/or network devices (such as support users 412 and 422 or client devices 4F-4H) associated with a patient (such as client users 410 and 420). For example, referring back to FIG. 4, super user 450 can be associated with a user profile 502 of a healthcare professional, such as a doctor, that provides one or more healthcare services to client users 410 and 420 and has access to all healthcare related information associated with client user 410 and client user 420. Support users 412A and 422A can be associated with a primary contact user profile, support users 412B and 422B can be associated with a caregiver user profile, support users 412C and 422C can be associated with a coordinator user profile, and support users 412D and 422D can be associated with a personal services user profile. Each of the support users 412 and 422 have access as indicated by the associated access parameters 506. In one or more embodiments, the default setting for any one or more access parameters 506 is no access, for example, a "No". Any one or more default settings could be used for any one or more of the access parameters 506. In one or more embodiments, the one or more user profiles 502 can be updated or modified dynamically. For example, two different users can be associated with the same user profile 502 but then each user profile 502 can be customized. For example, a first user and a second user can be associated with the healthcare professional user profile 502. The first user can be a generalist physician while the second user can be a specialist physician. The second user can require additional access parameters 506 while the first user can be given different access based on the access parameters 506.

While FIG. 5 illustrates one or more profile configurations 250 associated with a healthcare services network, the present disclosure contemplates that the one or more profile configurations 250 can be associated with any type of network environment. Additionally, the present disclosure contemplates that any one or more user profiles 502, one or more profile descriptions 504, and/or one or more access parameters 506 can be added or deleted based on a particular network environment, including dynamically.

All the data associated with client users 410 and 420 is securely communicated to the multi-modal portal system 18. For example, based on a profile configuration 250, each support user 412 or 422 can initiate via a client device 4F or 4G, respectively, a request to the multi-modal portal system 18. A request can comprise, for example, as illustrated in FIG. 6, a view request 600 or a store request 620 as well as any other type of request including, but not limited, to any of a modify request, a view request, a download request, a delete request, etc. A view request 600 can comprise any of a request type 602, a user identifier 260, a type of user data 604, a requestor identifier (ID) 606, any other information, or a combination thereof. A request type 602 can indicate that the request is a request to access user data associated with a user, for example, a client user 410 or 420, such as any of store, modify, view, delete, download, etc. The user identifier 260 can be indicative of a unique identifier, for example, that corresponds to the client user 410 or a client user 420, a support user 412 or a support user 422, a network device, or any combination thereof associated with the request. The type of user data 604 can be indicative of one or more access parameters 506 or any other type of data that a user associated with a user profile 502 can access such as view, modify, alter, store, manage, delete, etc.

The requestor ID 606 can be a unique identifier of a network, a multi-modal mesh hub 310, a client device 4 and/or a user associated with the view request 600. The requestor ID 606 may be required to ensure that the request is coming from a verified network or network device so as to ensure security and privacy of the user data. For example, a requestor ID 606 may prevent comingling of user data associated with a sensing device 5 that has been moved from one location to another or used with a new user without first being registered or otherwise associated with the different user and/or location. For example, with a healthcare services network, it is imperative that user data from a sensing device 5 only be associated with the intended patient or user. Requiring registration or association of the sensing device 5 prevents user data from incorrectly being stored or associated with the wrong user.

In one or more embodiments, the request type 602 is a request to store user data 610, a store request 620. In one or more embodiments, the store request 620 can include a request type 602, a user identifier 260, a type of user data 604, a requestor ID 606, and a user data 610. The user data 610 can comprise the data received from a sensing device 5, for example, data associated with the one or more access parameters 506. In one or more embodiments, the user data 610 can be encrypted for communication to the multi-modal portal system 18. In one or more embodiments, for each of the one or more requests 600 and/or 620 an audit trail or log is generated such that all access to, modification and/or storage of, etc. the user data 610 is recorded, for example, stored in a memory 24. The audit trail can be unalterable such that the audit trail provides an accurate representation of all requests associated with a user and/or user data.

In one or more embodiments, the multi-modal portal system 18 can monitor the user data 610 received to determine if a threshold associated with, for example, an access parameter 506 or a type of user data has been reached (the user data 610 is at, exceeded or fallen below the threshold). In one or more embodiments, the analytics engine 302 of the multi-modal portal system 18 plots, graphs, averages, filters, applies any one or more mathematical functions or operations, or any combination thereof to the user data 610 as part of the threshold determination. In one or more embodiments, the multi-modal portal system 18 can send a notification to one or more users associated with a user profile 502 (for example, one or more client users 410, 420, one or more support users 412, 422, or a super user 450) based on the threshold determination. For example, the multi-modal portal system 18 can determine based on user data received from a motion sensor that the client user has fallen and can send a notification to an emergency response unit requesting assistance. In another example, a threshold can be associated with a time interval for user data associated with an access parameter. The multi-modal portal system 18 can determine that user data has not been received within the time interval threshold and send a notification to one or more users associated with a user profile.

Figure 7:
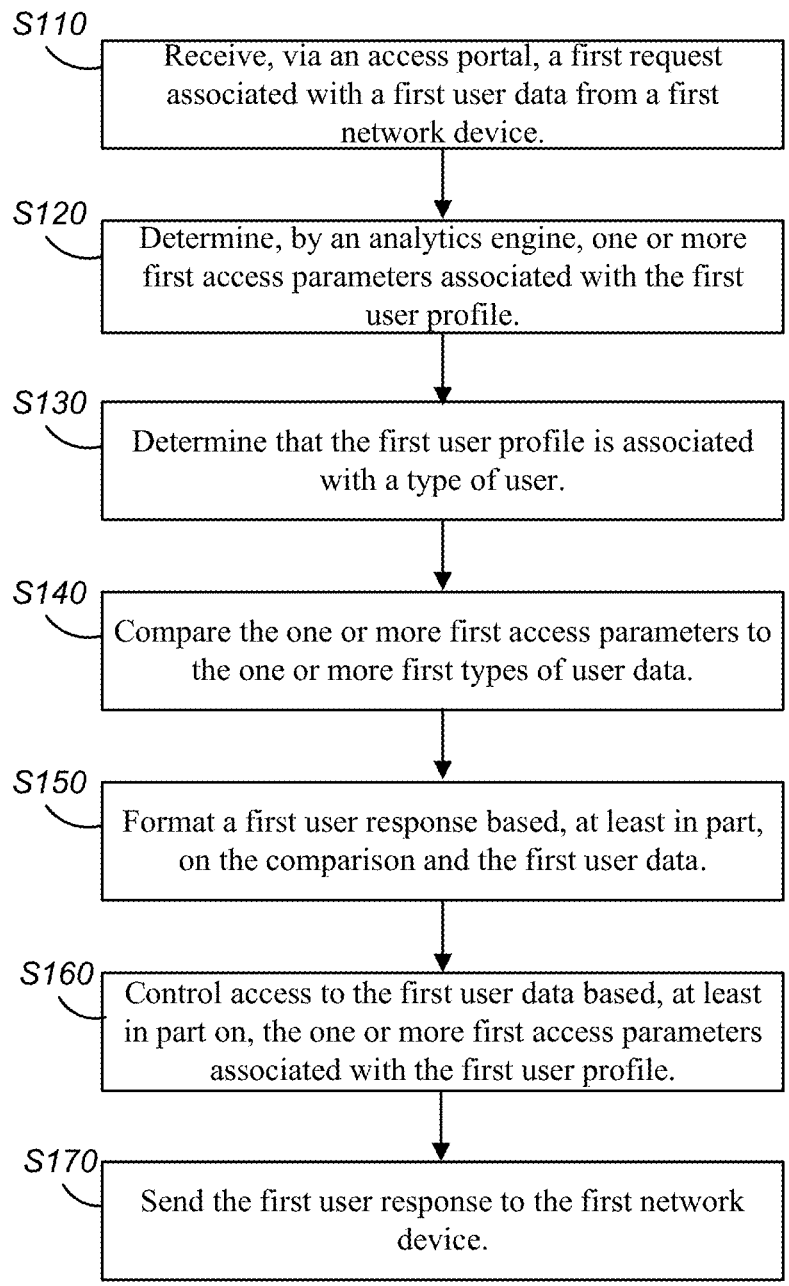
FIG. 7 is a flow chart illustrating a method for controlling access to user data, according to one or more aspects of the present disclosure.

FIG. 7 is a flow chart illustrating a method for configuration of one or more network devices, according to one or more aspects of the present disclosure.

The multi-modal portal system 18 may be programmed with one or more instructions such as a multi-modal portal application that when executed by a processor or controller causes the multi-modal portal system 18 to manage or control user data associated with one or more network devices and/or users in one or more embodiments. In FIG. 7, it is assumed that any one or more of the network devices include their respective controllers and their respective software stored in their respective memories, as discussed above in connection with FIGS. 1-4, which when executed by their respective controllers perform the functions and operations in accordance with the example embodiments of the present disclosure (e.g., including providing control of access to user data from one or more sensing devices 5).

The multi-modal portal system 18 comprises a controller 26 that executes one or more computer-readable instructions, stored on a memory 24, that when executed perform one or more of the operations of steps S110-S170. The multi-modal portal system 18 can comprise one or more software 25, for example, a multi-modal portal application. While the steps S110-S170 are presented in a certain order, the present disclosure contemplates that any one or more steps can be performed simultaneously, substantially simultaneously, repeatedly, in any order, or not at all (omitted).

At step S110, the multi-modal portal system 18 receives, via an access portal 306, a first request associated with a first user data from a first network device, for example, a first sensing device 5. In one or more embodiments, a sensing device 5 is included within or coupled to a first client device 4. The client device 4 is connected to a network via an access point device 2 such that the client device 4 can communicate the first user data to the multi-modal portal system 18 via a connection between the access point device 2 and the ISP 1 and the ISP 1 and the multi-modal portal system 18. The first user data can be associated with a first client user, such as client user 410 or client user 420 of FIG. 4. To perform an authorization or verification for the first request, the first request can comprise a first user identifier 260 such that the first request is associated with a first user profile 502, for example, a first user profile 502 of a profile configuration 250. The first user data can comprise one or more first types of user data, for example, one or more types of user data associated with one or more sensing devices 5.

As discussed with reference to FIG. 6, the first request can comprise a view request 600 or a store request 620. In one or more embodiments, the first request can comprise any type of request including but not limited to, a view request, a store data request, a modify request, a download request, a delete request, any other type of request associated with a first user data, or any combination thereof.

At step S120, an analytics engine 302 of the multi-modal portal system 18 determines one or more first access parameters associated with the first user profile. For example, each user (such as a support user 412 or support user 422 and/or a super user 450) can be associated with a unique user identifier 260 that is associated with a profile configuration 250. The profile configuration 250 provides the one or more access parameters 506 associated with a user profile 502 that is associated with the unique user identifier 260. The one or more first access parameters 506 limit the types of data that a user and/or a network device can access including, but not limited, any of viewing, modifying, altering, storing, managing, deleting, etc. any user data.

At step S130, the multi-modal portal system 18 determines that the first user profile is associated with a type of user. For example, the request can include a unique identifier 260 associated with a user. The unique identifier 260 can be associated with a profile configuration 250 that includes a user profile 502. The user profile 502 can indicate the type of user. For example, a support user 412 or a support user 422 can be associated with caregiver profile, a primary contact, a coordinator, etc. That is, each user and/or network device within a multi-modal portal system network can be associated with a user profile 502 such that the multi-modal portal system 18 can control access to user data based on the user profile 502.

At step S140, the multi-modal portal system 18 compares the one or more first access parameters 506 to the one or more first types of user data of the first request. For example, the first request can comprise a first type of user data associated with a first sensing device, such as a blood pressure monitor. The one or more types of data can correspond to one or more access parameters 506 associated with one or more user profiles 502 of a profile configuration 250. The user profile associated with the first request can indicate that diagnostic data is accessible or not accessible, such as viewable or not viewable, modifiable or not modifiable, storable or not storable, manageable or not manageable, etc. For example, as illustrated in FIG. 5 if a support user making the request is associated with a caregiver user profile, then the multi-modal portal system 18 can determine that diagnostic data is associated with the caregiver user profile.

At step S150, the multi-modal portal system 18 formats a first response to the first request based on the comparison of step S140 and the first user data. For example, if the first request is a view request 600, a first response can comprise the requested user data based on the type of user data 604 of the first request. As another example, if the first request is a store request 600, the first response can comprise a confirmation that the user data 610 of the store request 620 has been stored, for example, in a data aggregator 304.

At step S160, the multi-modal portal system 18 controls access to the first user data based on the one or more first access parameters 506 associated with the first user profile. For example, the analytics engine 302 can deny or allow access to the first user data. For example, if the comparison of step S140 indicates that the first user does not have a first user profile that permits access to the type of user data in the first request, the analytics engine 302 can deny the first request. Such denial can be indicated in the first response of step S150. Likewise, the analytics engine 302 can allow access if the comparison of step S140 so indicates and the first response of step S150 would then include the first user data sought by the first request.

At step S170, the multi-modal portal system 18 sends the first response to the first network device (for example, a client device 4) associated with the first request. For example, an access portal 306 of the multi-modal portal system 18 can interface with the client device 4, such as via an access point device 2 coupled to a client device 4, to communicate the first response. In one or more embodiments, the client device 4 comprises a user interface, such as a display, that displays the first response, such as a prompt received from the access portal 306.

In one or more embodiments, as discussed with reference to FIG. 4, multiple devices and multiple types of users can be associated with a user data. For example, a plurality of support users 412 or 422 and/or super user 450 can request access to user data associated with one or more users or subscribers, such as client users 410 and 420. The access portal 306 can thus receive a second request associated with a second user data from a second network device. For example, the first request can be associated with a support user 412A who is associated with a client user 410 while the second request can be associated with a support user 422 who is associated with a client user 420. The support user 412A can send the first request via a client device 4F while the support user 422A can send the second request via a client device 4G. The support user 412A is associated with a first user profile while the support user 422A is associated with a second user profile. In one or more embodiments, the first user profile and the second user profile can be the same, for example, both can be associated with a caregiver user profile. The analytics engine 302 can determine one or more second access parameters associated with the second user profile similar to or the same as step S120. Similar or the same as step S160, the access to the second user data is controlled based on the one or more second access parameters associated with the second user profile.

In one or more embodiments, the access portal 306 can receive a third request associated with the first user data and the second use data from a third network device. This third request can comprise a third user profile. For example, in reference to FIG. 4, the third network device can be client device 4H associated with a super user 450. The super user 450 can be associated with a third user profile, for example, a healthcare professional user profile 502. The super user 450 is included within multi-modal portal system networks 402A and 402B associated with client user 410 and client user 420, respectively. The analytics engine 302 can determine that the third user profile is associated with one or more third access parameters 506. For example, the healthcare professional user profile 502 of the super user 450 is associated with all of the access parameters 506 of FIG. 5. That is, the super user 450 has a user identifier 260 that is associated with a first profile configuration 250 for a first user and a second profile configuration for a second user such that the super user 450 can access user data associated with both the first user and the second user. Thus, the analytics engine 302 can cause the access portal 306, for example, to send the first user data and the second user data to the third network device (client device 4H) based on the one or more third access parameters.

In one or more embodiments, with reference to FIG. 3, the multi-modal portal system 18 can receive from a multi-modal mesh hub (such as multi-modal mesh hub 310A) a store request 620 to store a third user data in the data aggregator 304. For example, client device 4F of FIG. 4 can be part of the multi-modal mesh hub 310. The third user data can be associated with a first client user, for example, client user 410A of FIG. 4. The store request 620 includes a user identifier 260 that identifies a support user 412A associated with a client user 410A and a requestor DI 606 that identifies the client device 4F. The analytics engine 302 can verify not only the support user 412 but also the client device 4F are authorized or permitted to access the user data based on the profile configuration 250. For example, the analytics engine 302 can compare the requestor ID 606 to one or more identifiers associated with the user identifier 260. For example, one or more profile configurations 250 can include an identifier associated with one or more network devices, one or more users, or both. The requestor ID 606 can then be compared to the one or more identifiers associated with one or more profile configurations 250 for the user identifier 260. If the verification is successful, the analytics engine 302 stores the third user data, for example, in any of the data aggregator 304, a cloud repository, any other storage medium, or a combination thereof. In this way, the multi-modal portal application can base verification of a request on both the network or the network device and the user making the request.

According to one or more example embodiments of inventive concepts disclosed herein, there are provided novel solutions for configuring one or more network devices automatically using one or more configuration values retrieved from a network resource where the one or more configuration values are associated with one or more configuration parameters associated with the network device. The novel solutions according to example embodiments of inventive concepts disclosed herein provide features that enhance the installation and configuration of home/residential network gateway (GW) devices, wireless fidelity access points (Wi-Fi APs), any one or more other electronic devices, for example, for a home or enterprise, one or more wireless routers, one or more mesh networking nodes (e.g., Wi-Fi EasyMesh systems), and the like by providing automatic and dynamic configuration of network devices based on configuration values that can be verified, updated and stored in a network resource, such as a webform stored in a repository.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What I claim is:

1. A multi-modal portal system included within a plurality of multi-modal portal system networks for controlling access to user data comprising:
a memory storing one or more computer-readable instructions; and
a processor configured to execute the one or more computer-readable instructions to:
receive, via an access portal, a first request for a first user data from a first network device of a first multi-modal portal system network of the plurality of multi-modal portal systems networks, wherein the first user data is associated with one or more sensing devices associated with a first client user associated with the first multi-modal portal system network, wherein the first request is associated with a first user profile of a plurality of first user profiles associated with a first profile configuration associated with the first client user, wherein the first user data comprises one or more first types of user data, wherein the first profile configuration assigns a first role of a plurality of roles to the first client user that is different from another client user associated with the first profile configuration, wherein the multi-modal portal system comprises a second network device associated with a super user, and wherein the super user is associated with at least one user profile of the plurality of first user profiles associated with a second role of the plurality of roles that is associated with at least the first multi-modal portal system network and a second multi-modal portal system network of the plurality of multi-modal portal system networks;
determine, by an analytics engine, one or more first access parameters associated with the first user profile, wherein the one or more first access parameters limit the one or more types of user data that are accessible by the first client user, the first network device, or both, and wherein the one or more first access parameters indicate access different from one or more other access parameters associated with another user profile of the plurality of first user profiles; and control access to the first user data based on the one or more first access parameters associated with the first user profile and the first multi-modal portal system network, wherein the one or more first access parameters indicate an access to at least one of the one or more types of user data associated with the first user profile comprising any of a video call, a camera data, sensor data, or any combination thereof.

2. A multi-modal portal system of claim 1, wherein the first request comprises an access request for the first user data from a data aggregator.

3. A multi-modal portal system of claim 1, wherein the processor is further configured to execute the one or more instructions to:

compare the one or more first access parameters to the one or more first types of user data;

format a first response based on the comparison and the first user data; and send the first response to the first network device.

4. A multi-modal portal system of claim 1, wherein the processor is further configured to execute one or more instructions to:

determine that the first user profile is associated with a type of user; and wherein the one or more first access parameters are based on the type of user.

5. The multi-modal portal system of claim 1, wherein the processor is further configured to execute one or more instructions to:

receive, via the access portal, a second request associated with a second user data from a second network device of the first multi-modal portal system network, wherein the second user data is associated with a second client user associated with the first multi-modal portal system network, wherein the second request comprises a second user profile of the plurality of first user profiles and wherein the second user data comprises one or more second types of data;

determine, by the analytics engine, one or more second access parameters associated with the second user profile; and control access to the second user data based on the one or more second access parameters associated with the second user profile.

6. The multi-modal portal system of claim 5, wherein the processor is further configured to execute one or more instructions to:

receive, via the access portal, a third request associated with the first user data and the second user data from a third network device of the first multi-modal portal system network, wherein the third request comprises a third user profile of the plurality of first user profiles;

determine that the third user profile is associated with one or more third access parameters; and wherein the controlling access to the second user data and the first user data comprises:

sending the first user data and the second user data to the third network device based on the one or more third access parameters.

7. The multi-modal portal system of claim 1, wherein the processor is further configured to execute one or more instructions to:

receive, from a multi-modal mesh hub of the first multi-modal portal system network, a store request to store a third user data in the data aggregator, wherein the third user data is associated with the first client user, wherein the store request comprises a requestor identifier;

verify the requestor identifier based on the client user; and store the third user data based on the verification.

8. A method for providing a multi-modal portal system included within a plurality of multi-modal portal system networks for controlling access to user data, the method comprising:

receiving, via an access portal, a first request for a first user data from a first network device of a first multi-modal portal system network of the plurality of multi-modal portal systems networks, wherein the first user data is associated with one or more sensing devices associated with a first client user associated with the first multi-modal portal system network, wherein the first request comprises a first user profile of a plurality of the first user profiles associated with a first profile configuration associated with the first client user, wherein the first user data comprises one or more first types of user data, wherein the first profile configuration assigns first role of a plurality of roles to the first client user that is different from another client user associated with the first profile configuration, wherein the multi-modal portal system comprises a second network device associated with a super user, and wherein the super user is associated with at least one user profile of the plurality of first user profiles associated with a second role of the plurality of roles that is associated with at least the first multi-modal portal system network and a second multi-modal portal system network of the plurality of multi-modal portal system networks;

determining, by an analytics engine, one or more first access parameters associated with the first user profile, wherein the one or more first access parameters limit the one or more types of user data that are accessible by the first client user, the first network device, or both, and wherein the one or more first access parameters indicate access different from one or more other access parameters associated with another user profile of the plurality of first user profiles; and controlling access to the first user data based on the one or more first access parameters associated with the first user profile and the first multi-modal portal system network, wherein the one or more first access parameters indicate an access to at least one of the one or more types of user data associated with the first user profile comprising any of a video call, a camera data, sensor data, or any combination thereof.

9. The method of claim 8, wherein the first request comprises an access request for the first user data from a data aggregator.

10. The method of claim 8, further comprising:

comparing the one or more first access parameters to the one or more first types of user data;

formatting a first response based on the comparison and the first user data; and sending the first response to the first network device.

11. The method of claim 8, further comprising:

determining that the first user profile is associated with a type of user; and wherein the one or more first access parameters are based on the type of user.

12. The method of claim 8, further comprising:
receiving, via the access portal, a second request associated with a second user data from a second network device of the first multi-modal portal system network, wherein the second user data is associated with a second client user associated with the first multi-modal portal system network, wherein the second request comprises a second user profile of the plurality of first user profiles, and wherein the second user data comprises one or more second types of data;
determining, by the analytics engine, one or more second access parameters associated with the second user profile; and
controlling access to the second user data based on the one or more second access parameters associated with the second user profile.

13. The method of claim 12, further comprising:
receiving, via the access portal, a third request associated with the first user data and the second user data from a third network device of the first multi-modal portal system network, wherein the third request comprises a third user profile of the plurality of first user profiles;
determining that the third user profile is associated with one or more third access parameters; and
wherein the controlling access to the second user data and the first user data comprises:
sending the first user data and the second user data to the third network device based on the one or more third access parameters.

14. The method of claim 8, further comprising:
receiving, from a multi-modal mesh hub of the first multi-modal portal system network, a store request to store a third user data in the data aggregator, wherein the third user data is associated with the first client user, wherein the store request comprises a requestor identifier;
verifying the requestor identifier based on the client user; and
storing the third user data based on the verification.

15. A non-transitory computer-readable medium of a multi-modal portal system included within a plurality of multi-modal portal system networks comprising one or more instructions for controlling access to user data, which when executed by a processor of the multi-modal portal system, cause the multi-modal portal system to perform one or more operations comprising:
receiving, via an access portal, a first request for a first user data from a first network device of a first multi-modal portal system network of the plurality of multi-modal portal systems networks, wherein the first user data is associated with one or more sensing devices associated with a first client user associated with the first multi-modal portal system network, wherein the first request comprises a first user profile of a plurality of the first user profiles associated with a first profile configuration associated with the first client user, wherein the first user data comprises one or more first types of user data, wherein the first profile configuration assigns a first role of a plurality of roles to the first client user that is different from another client user associated with the first profile configuration, wherein the multi-modal portal system comprises a second network device associated with a super user, and wherein the super user is associated with at least one user profile of the plurality of first user profiles associated with a second role of the plurality of roles that is associated with at least the first multi-modal portal system network and a second multi-modal portal system network of the plurality of multi-modal portal system networks;
determining, by an analytics engine, one or more first access parameters associated with the first user profile, wherein the one or more first access parameters limit the one or more types of user data that are accessible by the first client user, the first network device, or both, and wherein the one or more first access parameters indicate access different from one or more other access parameters associated with another user profile of the plurality of first user profiles; and
controlling access to the first user data based on the one or more first access parameters associated with the first user profile and the first multi-modal portal system network, wherein the one or more first access parameters indicate an access to at least one of the one or more types of user data associated with the first user profile comprising any of a video call, a camera data, sensor data, or any combination thereof.

16. The non-transitory computer-readable medium of claim 15, wherein the one or more instructions when executed by the processor further cause the multi-modal portal system to further perform the one or more operations comprising:
comparing the one or more first access parameters to the one or more first types of user data;
formatting a first response based on the comparison and the first user data; and
sending the first response to the first network device.

17. The non-transitory computer-readable medium of claim 15, wherein the one or more instructions when executed by the processor further cause the multi-modal portal system to further perform one or more operations comprising:
determining that the first user profile is associated with a type of user; and
wherein the one or more first access parameters are based on the type of user.

18. The non-transitory computer-readable medium of claim 15, wherein the one or more instructions when executed by the processor further cause the multi-modal portal system to further perform one or more operations comprising:
receiving, via the access portal, a second request associated with a second user data from a second network device of the first multi-modal portal system network, wherein the second user data is associated with a second client user associated with the first multi-modal portal system network, wherein the second request comprises a second user profile of the plurality of first user profiles and wherein the second user data comprises one or more second types of data;
determining, by the analytics engine, one or more second access parameters associated with the second user profile; and
controlling access to the second user data based on the one or more second access parameters associated with the second user profile.

19. The non-transitory computer-readable medium of claim 18, wherein the one or more instructions when executed by the processor further cause the multi-modal portal system to further perform one or more operations comprising:
receiving, via the access portal, a third request associated with the first user data and the second user data from a third network device of the first multi-modal portal system network, wherein the third request comprises a third user profile of the plurality of first user profiles;

determining that the third user profile is associated with one or more third access parameters; and wherein the controlling access to the second user data and the first user data comprises:

sending the first user data and the second user data to the third network device based on the one or more third access parameters.

20. The non-transitory computer-readable medium of claim 15, wherein the one or more instructions when executed by the processor further cause the multi-modal portal system to further perform one or more operations comprising:

receiving, from a multi-modal mesh hub of the first multi-modal portal system network, a store request to store a third user data in the data aggregator, wherein the third user data is associated with the first client user, where the store request comprises a requestor identifier;

verifying the requestor identifier based on the client user; and storing the third user data based on the verification.

\* \* \* \* \*